United States Patent Office.

NEW ENGLAND VULCANITE HIDE COMPANY, OF BOSTON, MASSACHUSETTS, ASSIGNEES OF WILLIAM HENRY TOWERS.

*Letters Patent No.* 57,409, *dated August* 21, 1866; *reissue No.* 2,662, *dated June* 25, 1867.

IMPROVED PROCESS OF PREPARING HIDES AND OTHER ANIMAL TISSUES FOR THE MANUFACTURE OF VARIOUS ARTICLES.

The Schedule referred to in these Letters Patent and making part of the same.

TO ALL TO WHOM THESE PRESENTS SHALL COME:

Be it known that WILLIAM HENRY TOWERS, of the city, county, and State of New York, invented a new and useful process whereby raw hide, or leather wholly or partially tanned, or animal tissue of any description, or its component elements, fibrine and albumen, or their modification, gelatine, are made hard, semi-elastic, and translucent, and rendered a fit material or compound from which to manufacture combs, buttons, buckles, eye-glass frames, splints, knife-handles, articles of jewelry, and other articles now produced from vulcanized "India rubber."

The nature of said invention consists in so treating animal tissue with sulphur, or its combination or equivalents, as to form or produce the desired effect.

To enable those skilled in the arts to which said invention appertains to apply the same, I will proceed to describe the process used by me.

The hide or other animal tissue to be treated, in pieces of any suitable or convenient size, is immersed in a bath of boiling sulphur. This bath may contain rosin, or it may contain any coloring matter the color of which it may be desirable to communicate to the material. By the action of the sulphur the animal tissue throws off its impurities and becomes translucent, unless a dark and opaque color has been communicated to it by the coloring matter used, and a chemical combination takes place between the sulphur and the animal tissue subjected to its action analogous to that which takes place in the application of sulphur to India rubber. As soon as the above effect is produced, the raw hide, leather, or other animal tissue is removed from the bath, and it is impressed into any desirable form, in a mould, or otherwise, and dried. It is then hard and translucent, but if exposed too long to the action of the sulphur it becomes brittle; if so, it may be softened and rendered elastic by boiling in water for a greater or less length of time, according to the degree of elasticity required. The above compound of sulphur with animal tissue may be prepared from scraps of the before-mentioned materials, by treating them as by the above process, and after drying and pulverizing them, and mixing the powder with any adhesive gum or any coloring matter, pressing it into the desired form and drying as above mentioned. The compound may be rendered water-proof by means of any of the well known water-proofing materials or substances.

What is claimed as the invention of said WILLIAM H. TOWERS, and desired to be secured by Letters Patent, is—

The treatment, substantially as before described, of animal tissue of any description, or its component elements, fibrine and albumen, or their modification, gelatine, such animal tissues including raw hide, and leather partially or wholly tanned, by combining the same with sulphur, or any combination of or equivalent to sulphur, for the purpose of producing the compound or the effects before described.

THE NEW ENGLAND VULCANITE HIDE COMPANY,
By their Treasurer, WM. A. HAYES.

Witnesses:
FREDERICK CURTIS,
L. DAMON.